United States Patent
Berry et al.

(10) Patent No.: US 12,280,711 B2
(45) Date of Patent: Apr. 22, 2025

(54) ROOFTOP STRUCTURE FOR SEMI-AUTONOMOUS CTL

(71) Applicant: Caterpillar Inc., Peoria, IL (US)

(72) Inventors: Adam L. Berry, Raleigh, NC (US); Ashley Dallas Menges, Clayton, NC (US); William Clayton Martin, Stillwater, OK (US); Ryan P. Pecinovsky, Cedar Falls, IA (US); Scott M. Toombs, Daly City, CA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/585,485

(22) Filed: Feb. 23, 2024

(65) Prior Publication Data

US 2024/0190335 A1 Jun. 13, 2024

Related U.S. Application Data

(62) Division of application No. 17/750,881, filed on May 23, 2022, now Pat. No. 11,958,403.

(51) Int. Cl.
| | | |
|---|---|---|
| *B60Q 1/50* | (2006.01) | |
| *B60Q 1/26* | (2006.01) | |
| *G08B 5/36* | (2006.01) | |
| *G08B 21/18* | (2006.01) | |
| *G01S 7/481* | (2006.01) | |
| *G01S 17/931* | (2020.01) | |
| *H04N 23/90* | (2023.01) | |

(52) U.S. Cl.
CPC ............ *B60Q 1/507* (2022.05); *B60Q 1/2611* (2013.01); *G08B 21/18* (2013.01); *G01S 7/4813* (2013.01); *G01S 17/931* (2020.01); *G08B 5/36* (2013.01); *H04N 23/90* (2023.01)

(58) Field of Classification Search
CPC ...... B60Q 1/507; B60Q 1/2661; B60Q 21/18; G01S 17/931; G01S 7/4813
See application file for complete search history.

(56) References Cited

U.S. PATENT DOCUMENTS

| | | | |
|---|---|---|---|
| 4,797,673 | A | 1/1989 | Dombrowski |
| 8,527,191 | B2 | 9/2013 | Van Den Berg |
| 9,428,099 | B1 | 8/2016 | Doenges et al. |
| 9,802,533 | B2 | 10/2017 | Ruffner et al. |
| 9,889,795 | B1 | 2/2018 | Cronmiller et al. |

(Continued)

FOREIGN PATENT DOCUMENTS

| | | |
|---|---|---|
| EP | 3440523 | 2/2019 |
| WO | 2019197064 | 10/2019 |

OTHER PUBLICATIONS

"Autonomous Track Loader performs low-level excavation, grading tasks to boost jobsite productivity", Equipment World, Mar. 18, 2020, pp. 1-11, (Mar. 18, 2020), 11 pgs.

(Continued)

*Primary Examiner* — Hoi C Lau

(57) ABSTRACT

A work machine can include a machine frame; and a component box holding a plurality of electrical components mounted to a roof of the machine frame; wherein the component box includes a plurality of indicator light sets exposed on an outer surface of the component box, wherein the plurality of indicator light sets are configured to indicate to external personnel a mode of operation of the work machine.

13 Claims, 9 Drawing Sheets

(56) References Cited

U.S. PATENT DOCUMENTS

| | | |
|---|---|---|
| 9,914,403 B1 | 3/2018 | Richardson et al. |
| 10,178,798 B1* | 1/2019 | Christensen ............ G06F 1/188 |
| 10,562,440 B1 | 2/2020 | Julian et al. |
| 10,645,832 B1* | 5/2020 | Degner .................... H05K 5/03 |
| 10,692,304 B1 | 6/2020 | Deyaf et al. |
| 10,920,395 B1 | 2/2021 | Ready-campbell et al. |
| 11,338,860 B2 | 5/2022 | Ries et al. |
| 11,449,068 B2 | 9/2022 | Donini et al. |
| 11,532,221 B1 | 12/2022 | Rogan et al. |
| 11,697,920 B2 | 7/2023 | Kiyota et al. |
| 11,958,403 B2* | 4/2024 | Berry .................. B60Q 1/2611 |
| 2004/0032722 A1* | 2/2004 | Wrycraft ............. H05K 9/0062 361/725 |
| 2005/0149244 A1 | 7/2005 | Matsuda |
| 2005/0169706 A1* | 8/2005 | Dillingham .......... A01C 15/006 404/110 |
| 2006/0133036 A1* | 6/2006 | Durney ................... G06F 1/203 361/688 |
| 2007/0002536 A1* | 1/2007 | Hall .................... H05K 7/20754 361/695 |
| 2007/0215398 A1* | 9/2007 | Ferdows .................. B60K 1/04 180/68.4 |
| 2008/0062642 A1* | 3/2008 | Figuerado .......... H05K 7/20727 361/695 |
| 2008/0180903 A1* | 7/2008 | Bisson ............... H05K 7/20736 361/728 |
| 2008/0310097 A1* | 12/2008 | Sherrod ............... H05K 7/1488 361/679.4 |
| 2010/0026509 A1 | 2/2010 | Boehm et al. |
| 2010/0060439 A1 | 3/2010 | Fitzgerald |
| 2010/0087956 A1* | 4/2010 | Regimbal ............. H05K 7/2019 700/282 |
| 2010/0142143 A1* | 6/2010 | Ong ................... H05K 7/20581 361/679.48 |
| 2010/0218920 A1* | 9/2010 | Vaananen .......... H05K 7/20581 29/890.035 |
| 2010/0289662 A1 | 11/2010 | Dasilva et al. |
| 2010/0296246 A1* | 11/2010 | Kishimoto ......... H05K 7/20172 361/695 |
| 2010/0313760 A1* | 12/2010 | Crabtree ............ B01D 39/1623 55/385.6 |
| 2011/0007474 A1* | 1/2011 | Detore .................... G01N 33/92 361/679.48 |
| 2011/0022267 A1 | 1/2011 | Murphy |
| 2011/0175007 A1* | 7/2011 | Sato ................... H05K 7/20172 251/301 |
| 2012/0000169 A1* | 1/2012 | Ahn ....................... B01D 46/10 55/383 |
| 2012/0098292 A1* | 4/2012 | Huotari ..................... B60J 7/10 296/100.09 |
| 2012/0133255 A1* | 5/2012 | Izuno ................ H05K 7/20727 312/236 |
| 2012/0293944 A1* | 11/2012 | Yi ........................ H05K 7/1487 361/679.32 |
| 2013/0146274 A1* | 6/2013 | Sugimoto .......... H05K 7/20572 165/96 |
| 2013/0231039 A1* | 9/2013 | Nagasaka ............ H05K 5/0213 454/184 |
| 2014/0037462 A1* | 2/2014 | Mashak ................ F04D 27/002 417/2 |
| 2015/0208554 A1* | 7/2015 | Leigh ................. H05K 7/20754 165/80.3 |
| 2016/0005286 A1 | 1/2016 | Kiyota |
| 2016/0052762 A1 | 2/2016 | Swift |
| 2016/0219754 A1* | 7/2016 | Anderl .................. F04D 25/166 |
| 2016/0243982 A1 | 8/2016 | Ruffner et al. |
| 2017/0270786 A1 | 9/2017 | Swaminathan et al. |
| 2017/0282784 A1 | 10/2017 | Foster et al. |
| 2017/0314453 A1* | 11/2017 | West ....................... F01P 7/04 |
| 2017/0349093 A1 | 12/2017 | Peacock |
| 2018/0011522 A1* | 1/2018 | Shirakami ............... G06F 1/206 |
| 2018/0228004 A1 | 8/2018 | Masuda et al. |
| 2018/0238513 A1 | 8/2018 | Measel et al. |
| 2018/0272931 A1 | 9/2018 | Salter et al. |
| 2018/0273157 A1* | 9/2018 | Hoogeveen ........... E05D 15/264 |
| 2018/0281672 A1 | 10/2018 | Squicciarini |
| 2018/0319320 A1 | 11/2018 | Tatara et al. |
| 2019/0241124 A1 | 8/2019 | Izumikawa et al. |
| 2019/0248421 A1* | 8/2019 | Jacobsthal ............. B62D 25/06 |
| 2020/0095815 A1* | 3/2020 | Muldrock ................ E05D 5/06 |
| 2020/0124659 A1* | 4/2020 | Xu ...................... G01R 31/2856 |
| 2020/0156532 A1 | 5/2020 | Lee et al. |
| 2020/0215962 A1 | 7/2020 | Brower et al. |
| 2020/0282919 A1 | 9/2020 | Yabe et al. |
| 2020/0291614 A1 | 9/2020 | Kiyota et al. |
| 2020/0375063 A1* | 11/2020 | Reichenbach ....... H05K 7/2089 |
| 2021/0006199 A1 | 1/2021 | Kim |
| 2021/0094586 A1 | 4/2021 | Yamasaki et al. |
| 2021/0100156 A1 | 4/2021 | Iwase et al. |
| 2021/0129747 A1 | 5/2021 | Roeber et al. |
| 2021/0158674 A1 | 5/2021 | Cherney et al. |
| 2021/0161034 A1* | 5/2021 | Jeong .................... G06F 1/1632 |
| 2021/0174660 A1 | 6/2021 | Kamimura et al. |
| 2021/0240239 A1* | 8/2021 | He ........................... G06F 1/206 |
| 2021/0253022 A1 | 8/2021 | Carlsson et al. |
| 2021/0254308 A1 | 8/2021 | Thibblin et al. |
| 2021/0259139 A1* | 8/2021 | Gao .................... H05K 7/20172 |
| 2021/0276494 A1 | 9/2021 | Impola et al. |
| 2021/0284034 A1* | 9/2021 | Klein .................. H05K 7/20172 |
| 2021/0284244 A1* | 9/2021 | Ries ...................... B62D 25/06 |
| 2021/0349466 A1 | 11/2021 | Donini et al. |
| 2021/0400841 A1* | 12/2021 | Okumura ........... H05K 7/20727 |
| 2022/0201206 A1 | 6/2022 | Yamada et al. |
| 2022/0267131 A1 | 8/2022 | Magzimof et al. |
| 2022/0364332 A1 | 11/2022 | Ishikawa et al. |
| 2022/0373152 A1 | 11/2022 | Huenink et al. |
| 2022/0373222 A1* | 11/2022 | Tyberghein ............. F24F 13/14 |
| 2022/0403682 A1* | 12/2022 | Bergum .................. E05C 9/185 |
| 2023/0042502 A1* | 2/2023 | He ...................... H05K 7/20145 |
| 2023/0054457 A1 | 2/2023 | Rogan et al. |
| 2023/0114366 A1 | 4/2023 | Eguchi et al. |
| 2023/0269899 A1* | 8/2023 | Takken ............... H05K 7/20136 361/678 |
| 2023/0284411 A1* | 9/2023 | Levitan ............... H05K 7/20172 361/690 |
| 2023/0398927 A1* | 12/2023 | Berry ........................ E02F 9/26 |
| 2024/0190335 A1* | 6/2024 | Berry ..................... G08B 21/18 |
| 2024/0206111 A1* | 6/2024 | Sanada ............... H05K 7/20154 |
| 2024/0270207 A1* | 8/2024 | Chen .................. G07C 9/00896 |

OTHER PUBLICATIONS

"U.S. Appl. No. 17/750,881, Non Final Office Action mailed Jun. 8, 2023", 7 pgs.

"U.S. Appl. No. 17/750,881, Response filed Sep. 8, 2023 to Non Final Office Action mailed Jun. 8, 2023", 8 pgs.

"U.S. Appl. No. 17/750,881, Notice of Allowance mailed Dec. 21, 2023", 9 pgs.

"U.S. Appl. No. 17/750,881, Final Office Action mailed Oct. 5, 23", 8 pgs.

"U.S. Appl. No. 17/750,881, Response filed Dec. 5, 2023 to Final Office Action mailed Oct. 5, 2023", 5 pgs.

"U.S. Appl. No. 17/750,881, Restriction Requirement mailed May 10, 2023", 6 pgs.

"U.S. Appl. No. 17/750,881, Response filed May 16, 2023 to Restriction Requirement mailed May 10, 2023", 2 pgs.

"International Application Serial No. PCT/US2023/019180, International Search Report and Written Opinion mailed Jul. 14, 2023", 12 pgs.

* cited by examiner

ROOFTOP STRUCTURE FOR SEMI-AUTONOMOUS CTL

CLAIM OF PRIORITY

This application is a divisional of U.S. patent application Ser. No. 17/750,881, filed on May 23, 2022, the benefit of priority of which is claimed hereby, and which is incorporated by reference herein in its entirety.

TECHNICAL FIELD

This disclosure relates to construction equipment, and more specifically to a component box for a work machine.

BACKGROUND

Work machines, such as compact track loaders include various work tools to accomplish different construction jobs. A semi-autonomous or autonomous machine is a machine that can use a variety of sensors to detect the area around a machine so that the machine can operate without a driver or can be used to assist the driver while they operate the machine. A machine rooftop box can provide space for such components.

WO2019197064 discusses a work machine with a guidance system including a rooftop box.

SUMMARY

In an example according to this disclosure, a work machine can include a machine frame; and a component box holding a plurality of electrical components mounted to a roof of the machine frame; wherein the component box includes a plurality of indicator light sets exposed on an outer surface of the component box, wherein the plurality of indicator light sets are configured to indicate to external personnel a mode of operation of the work machine.

In another example, a work machine can include a machine frame; a component box holding a plurality of electrical components mounted to a roof of the machine frame; wherein the component box includes an enclosure compartment defined by a lower wall, four side walls and an upper cover, wherein the enclosure compartment includes a central wall extending a length of the enclosure compartment dividing the enclosure compartment into a first half and a second half; and a dual blower fan positioned within the enclosure compartment with one blower directed to the first half and a second blower directed to the second half.

In another example according to the present disclosure, a work machine can include a machine frame; and a component box holding a plurality of electrical components mounted to a roof of the machine frame; wherein the component box includes an enclosure compartment defined by a lower wall, four side walls and an upper cover, wherein the upper cover includes a bi-fold cover includes a first cover and a second cover.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
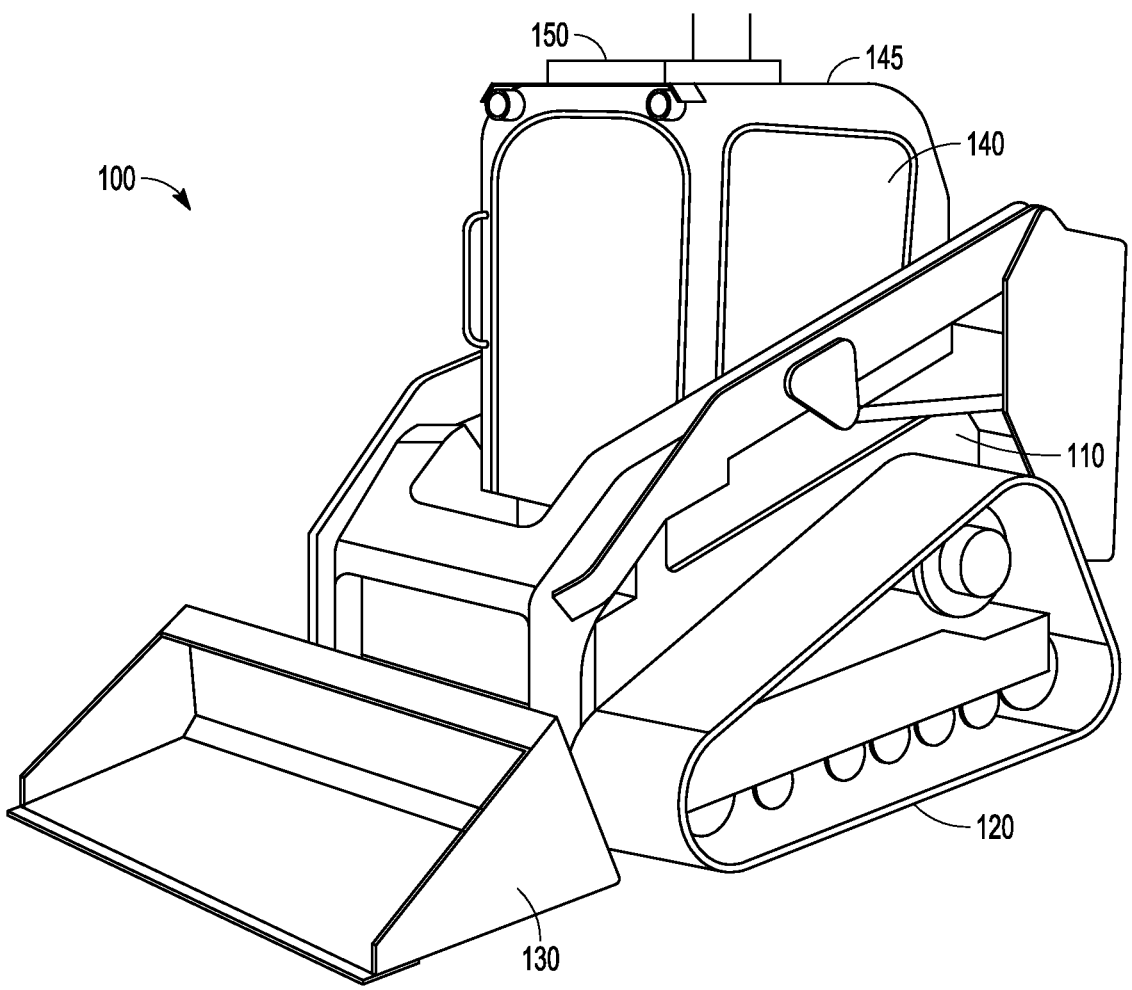
FIG. 1 shows a perspective view of a compact track loader, in accordance with one embodiment.

FIG. 1 shows a perspective view of a work machine 100, such as a compact track loader, in accordance with one embodiment. The work machine 100, can include a machine frame 110 with transportation devices 120 and a work implement 130 attached to the machine frame 110. Transportation devices 120 can include tracks or wheels, for example. The work implement 130 can include a bucket, forks, a shovel, a plow, or other work implement.

The machine frame 110 connects and associates the various physical and structural features that enable the work machine 100 to function. These features can include a cab 140 that is mounted on top of the machine frame 110 from which an operator can control and direct operation of the work machine 100. Accordingly, a variety of controls can be located within the cab 140. To propel the work machine 100 over a surface, a power system such as an internal combustion engine can also be mounted to the machine frame 110 and can generate power that is converted to physically move the machine.

The work machine 100 can be an autonomous or semi-autonomous machine. As such, a 360° object detection system can be needed for autonomous vehicles. For example, lidar sensors and cameras need to be placed on the machine in specific locations to achieve the required 360° field of view for object detection.

Accordingly, the present system provides a component box 150 on a roof 145 of the cab 140. The component box 150 can hold a variety of electronic equipment and sensors to allow for autonomous control. A 360 degree field of view can be established by the lidar sensors and the placement of the cameras and antennas and other components allow for that field of view in conjunction with the base structural elements of the box.

Figure 2:
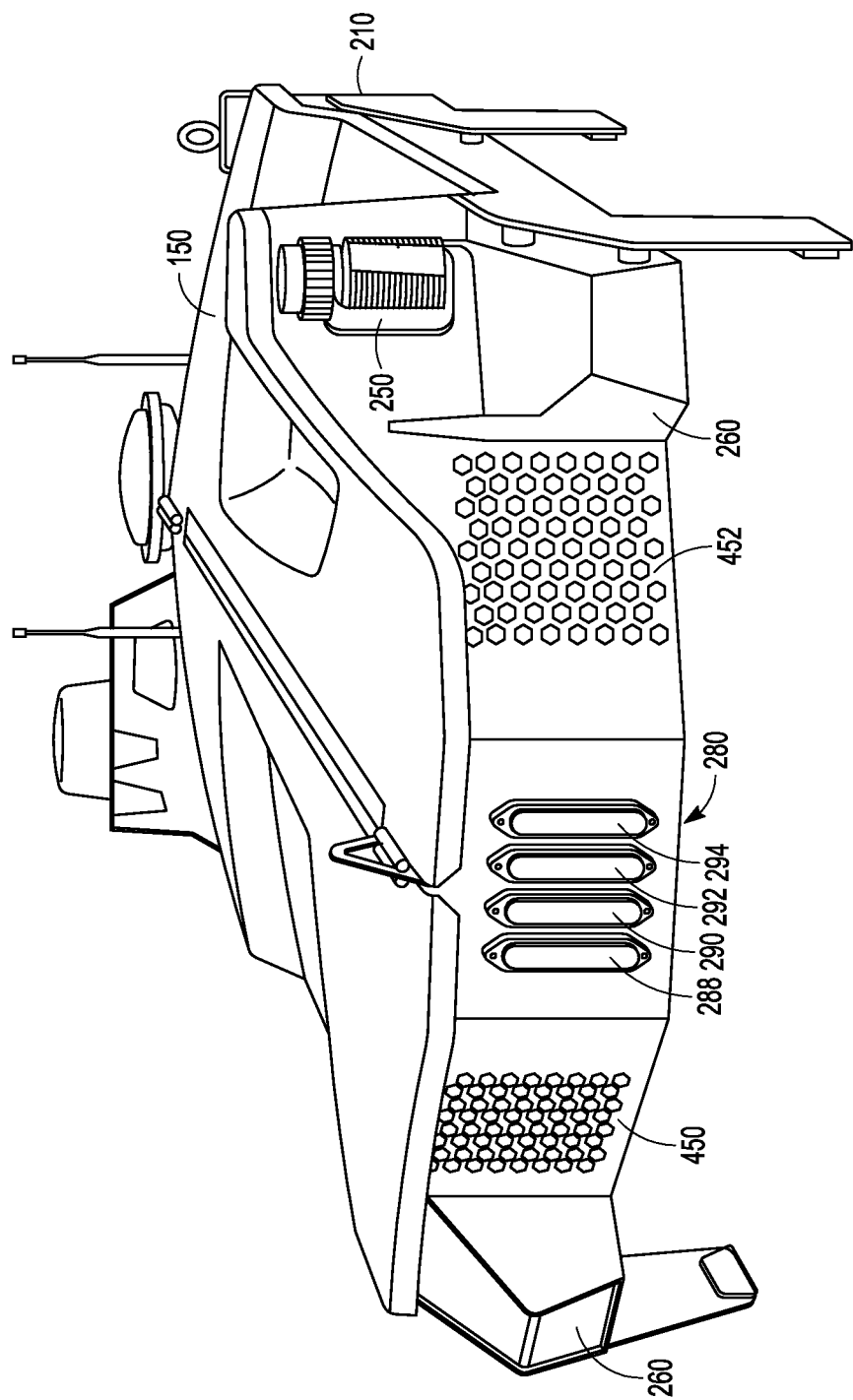
FIG. 2 shows a front perspective view of a component box, in accordance with one embodiment.
Figure 3:
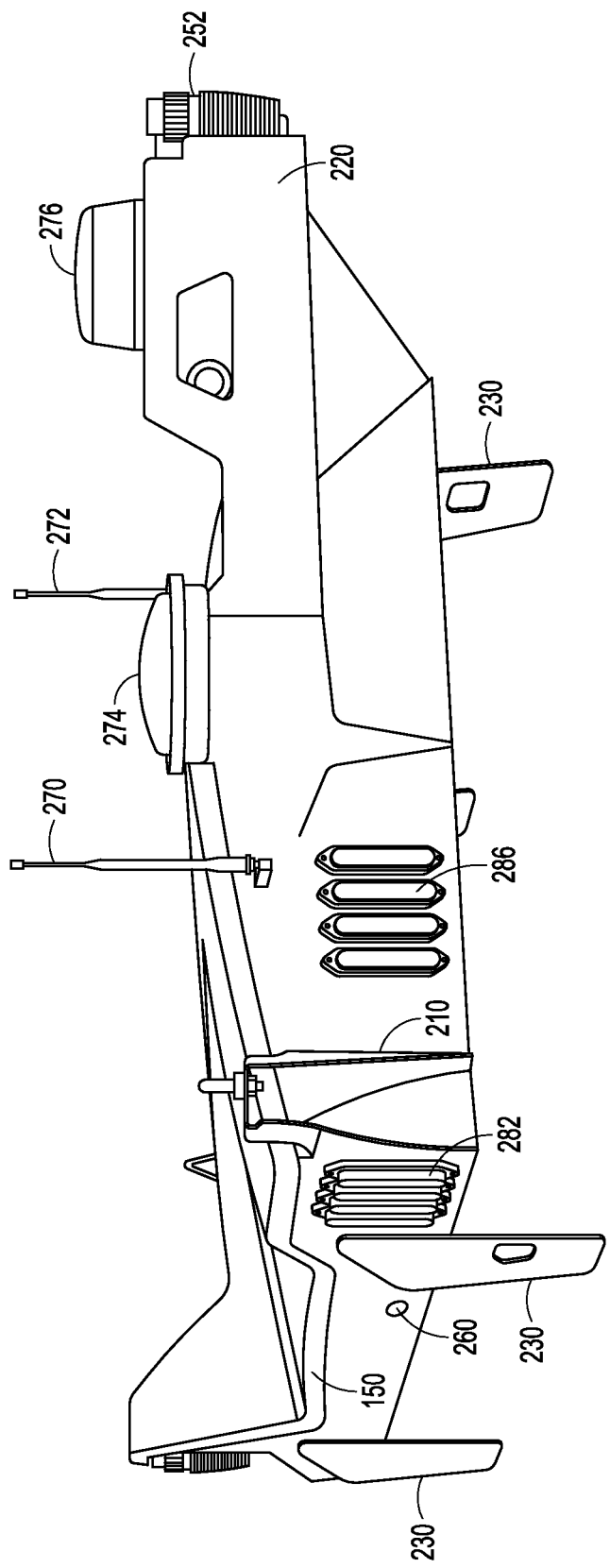
FIG. 3 shows a rear, left perspective view of the component box, in accordance with one embodiment.
Figure 4:
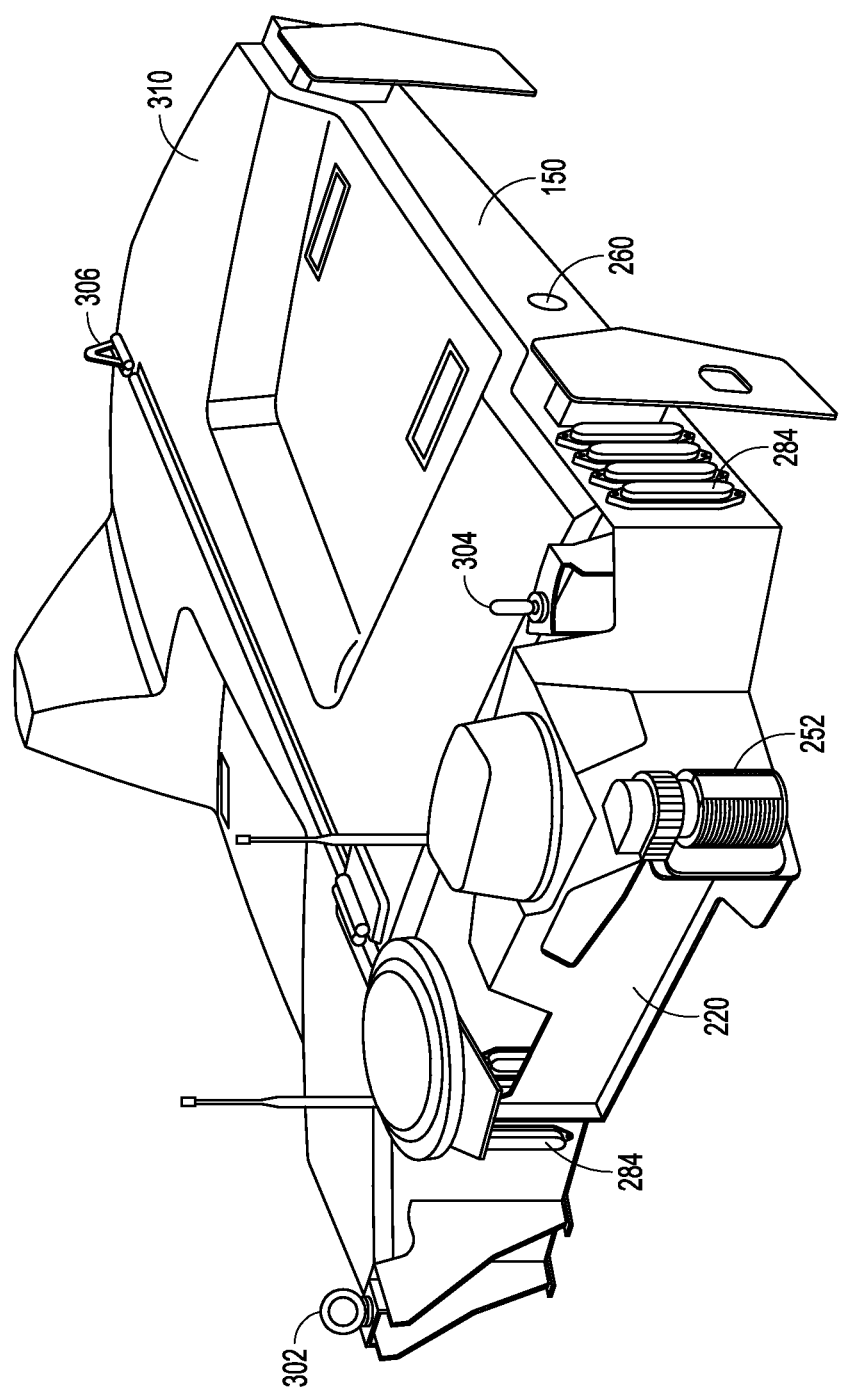
FIG. 4 shows a rear, right perspective view of the component box, in accordance with one embodiment.

FIG. 2 shows a front perspective view of the component box 150, in accordance with one embodiment; FIG. 3 shows a rear, left perspective view of the component box 150; and FIG. 4 shows a rear, right perspective view of the component box 150.

Here, the component box can generally include a main body 210 and a rear bracket 220 extending from a rear surface of the main body 210. A plurality of legs 230 are used to attach the component box 150 to the work machine.

The component box 150 can further include a plurality of indicator light sets 280, 282, 284, and 286 exposed on an outer surface of the component box 150. The plurality of indicator light sets 280-286 are configured to indicate to external personnel a mode of operation of the work machine 100.

For example, each of the plurality of indictor light sets 280-286 can include a first light 288 to indicate that the work machine 100 is in an unmanned operation, a second light 290 to indicate that the work machine 100 is in manned operation, a third light 292 to indicate that the system has temporally stopped due to an error or due to an emergency stop or an autonomous stop being pressed, and a fourth light 294 to indicate when the work machine system detects a person In this example, the plurality of indicator lights sets 280-286 can include four indicator light sets 280-286, with the first indicator set 280 located on a front outer surface of the component box 150, a second indicator light set 282 on a first side surface of the component box 150, a third indicator light set 284 on a second, opposite side surface of the component box 150 from the second indicator lights set 282, and a fourth indicator light set 286 on a back surface of the component box 150. By strategically placing the four sets of the indicator light sets 280-286 a 360 degree coverage around the work machine 100 can be provided. Accordingly, anyone around the work machine 100 can see and determine what mode the work machine 100 is in.

In this example, the component box can further include three lifting members 302, 304, 306 with a first lifting member 302 at a back corner of the component box 150, a second lifting member 304 at an opposite back corner than the first lifting member 302, and a third lifting member 306 at a central front location of the component box 150. The lifting members 302-306 will be further discussed below.

There can also be an assortment of sensors for the components box 150. For example, a first lidar sensor 250 can be located at a front corner of the component box 150 and a second lidar sensor 252 can be located at a back corner of the component box 150 on an opposite side of the component box 150 than the first lidar sensor 250 and positioned out on a bracket 220 extending away from a back corner of the component box 150. The lidar sensors 250, 252 can be operatively attached to electronic components which are located within the component box 150 to provide 360 degree lidar coverage around an environment of the work machine.

The sensors for the component box 150 can further include a plurality of cameras 260 positioned to provide visual coverage of an environment around the work machine. In one example, the plurality of cameras 260 can include five cameras located to provide 360 degree coverage. For example, the five camera can include a first camera 260 on a front corner of the component box 150, a second camera 260 on an opposite front corner of the component box 150 from the first camera 260, a third camera 260 on one side surface of the component box 150, a fourth camera 260 on a second side surface of the component box 150, opposite the third camera 260, and a fifth camera (not shown) that can be coupled to a back of the machine frame 110 (FIG. 1) and coupled by a wire to a back end of the component box 150.

The system can further include a plurality of antennas 270, 272, 274 and 276 on the component box 150, which are arranged and positioned to avoid interference with each other. In this example, the plurality of antennas can include a first 2.4 GHz or 900 MHz antenna 270 mounted on a back end of the component box 150. The second antenna 272 can include a 900 MHz antenna positioned on a back end of the component box 150. The third antenna 274 can include a GPS receiver located on the bracket 220 extending from a back surface of the main body 210 of the component box 150. The fourth antenna 276 can include a 2.4 GHz or 5 GHz Wi-Fi antenna located on the bracket 220 extending from a back corner of the main body 210 of the component box 150. The fourth antenna 276 is further raised on the bracket 220 to minimize or eliminate any interference from the GPS receiver, third antenna 272.

The cameras and sensors discussed above have been given specific positions and orientations relative to the component box structure to provide a particular field of view that is unobstructed by elements of the box, antennas, and other structures. (Other details of the lidar sensors and cameras are discussed in docket 4992.223US1, filed on an even date herewith, and incorporated by reference herein in its entirety).

Figure 5:
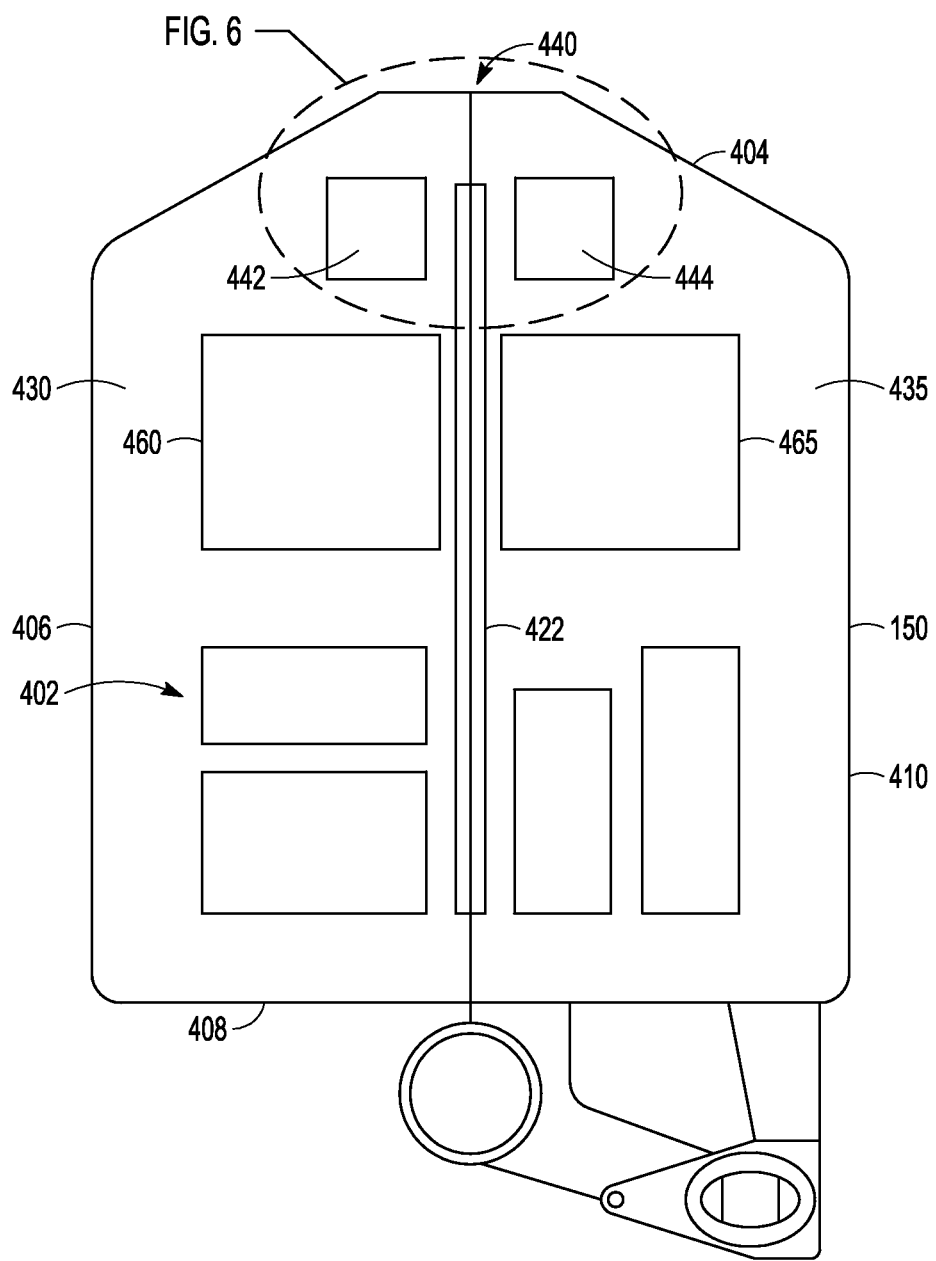
FIG. 5 shows a top view of the internal structure of the component box, in accordance with one embodiment.
Figure 6:
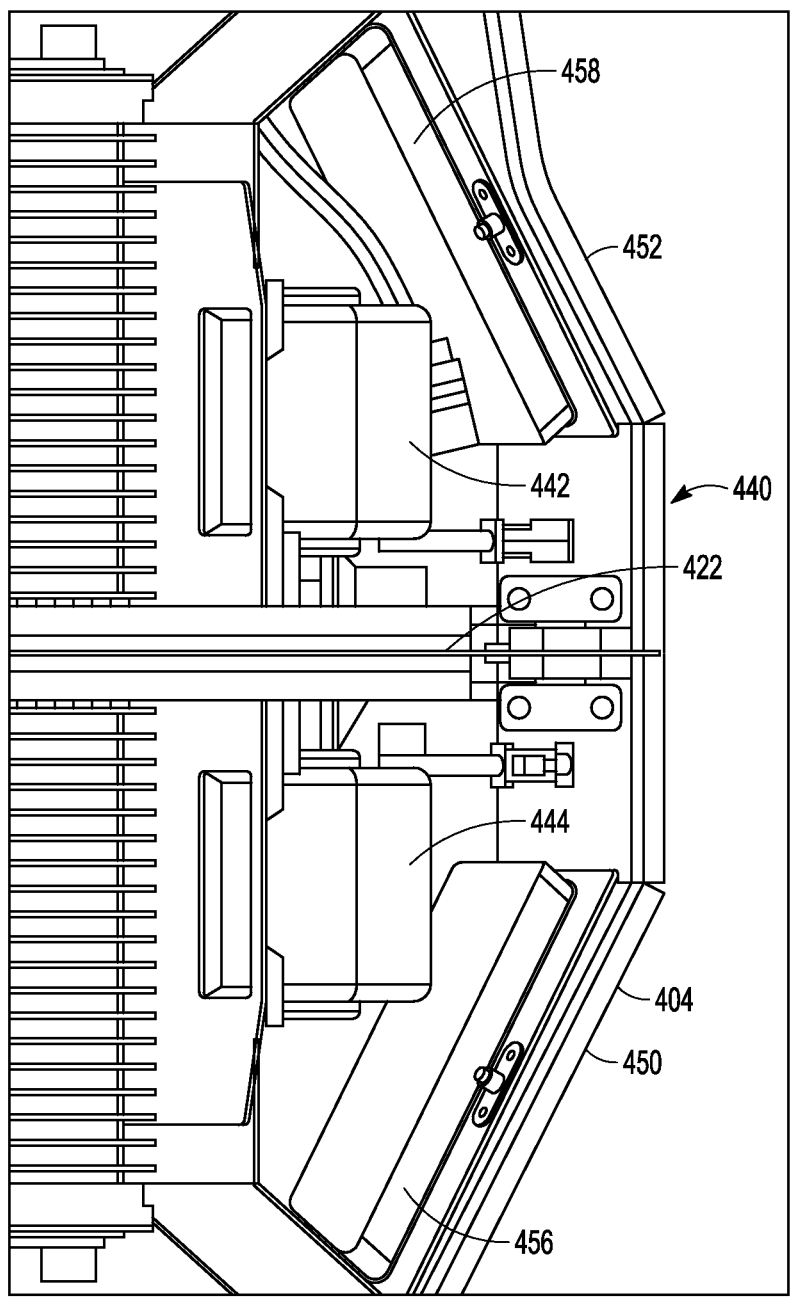
FIG. 6 shows a detail view of the internal structure of the component box of FIG. 5.

FIG. 5 shows a top view of the internal structure of the component box 150, in accordance with one embodiment; and FIG. 6 shows a detail view of the internal structure of the component box 150 of FIG. 5.

Here, the component box 150 includes an enclosure compartment 402 defined by a lower wall, four side walls 404, 406, 408, 410 and an upper cover 310 (Not shown in FIG. 5, see FIG. 4). The enclosure compartment 402 includes a central wall 422 extending a length of the enclosure compartment 402 dividing the enclosure compartment into a first half 430 and a second half 435. A dual blower fan 440 is positioned within the enclosure compartment 402 with one blower 442 directed to blow air into the first half 430 and a second blower 444 directed to blow air into the second half 435. The dual blower fan 440 is used to cool the various electronic components that are located in each half of the enclosure compartment 402.

Here, the dual blower fan 440 can be mounted at a front portion of the component box 150 and is adjacent to one or more air intakes 450, 452 in the front side wall 404 of the component box 150.

The system can further include on or more air filters 456, 458 positioned at the air intakes 450, 452. The air filters 456, 458 can help to increase the life of the dual blower fan 440 and decrease particulate in the enclosure compartment 402.

The plurality of electrical components within the enclosure compartment 402 can include one or more thermally sensitive components and the thermally sensitive components can be positioned in the enclosure compartment 402 within an airflow path to maximize cooling. Thus, any thermally sensitive components can be placed at strategic locations within the airflow path.

For example, one or more thermally sensitive components can include dual electronic control modules (ECMs) 460, 465, with one ECM 460, 465 on each side of the central wall 422. The ECMs 460, 465 can include dual autonomy ECMs with distributed setup. Feedthrough wiring can be channeled through the central wall 422 to communicate between the first half 430 and the second half 435.

Here, the ECMs 460, 465 are positioned directly after the respective blowers 442, 444 to receive the coolest cooling air. Other electronics, such as radios, receivers, and routers can be positioned toward the rear of the enclosure compartment 402. This orientation provides a direct airflow to the ECMs, where the most heat is generated.

Figure 7:
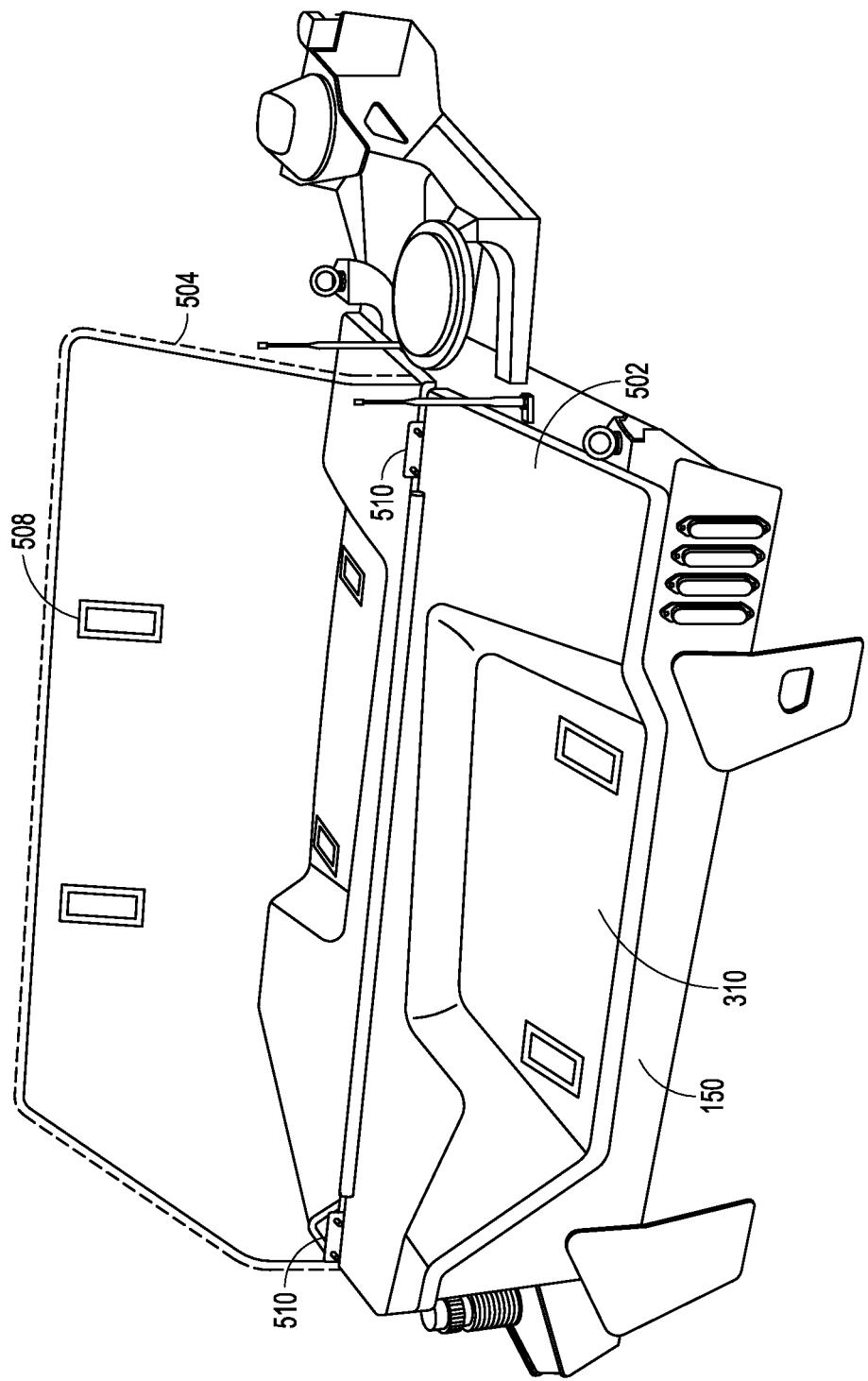
FIG. 7 shows a perspective view of the component box, in accordance with one embodiment.

FIG. 7 shows a perspective view of the component box 150, in accordance with one embodiment. Here, the upper cover 310 of the component box 150 can include a bi-fold cover including a first cover 502 and a second cover 504 which are attached by one or more hinges 510 to the central wall 422 (FIG. 5). The first cover 502 and the second cover 504 can open and close independently of each other. Here, second cover 504 is shown in phantom lines in the open position. Likewise, first cover 502 can swing up and open in a like manner. Using the two covers 502, 504 allows a user to open up either half of the component box 150 to allow for serviceability by standing on work machine 100 tracks, for example. Each of the covers 502, 504 can further include one or more locks 508.

Figure 8:
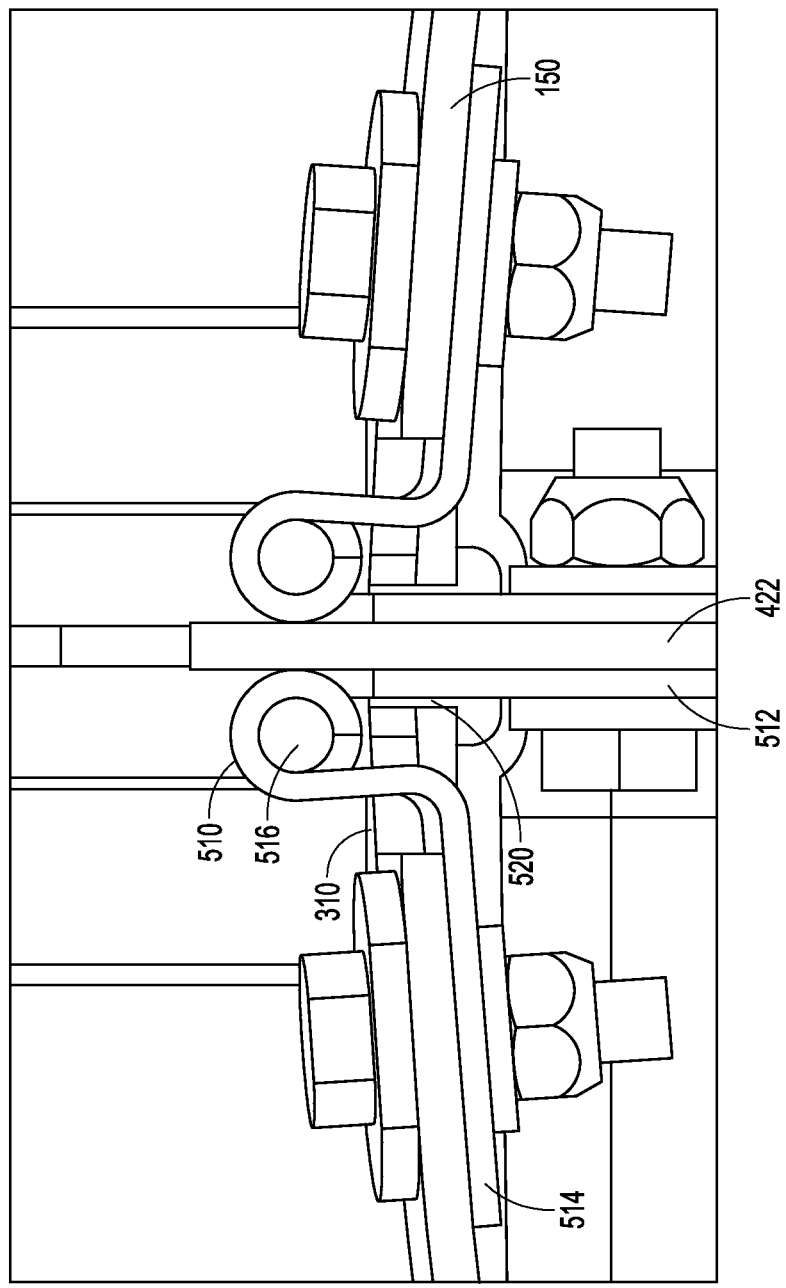
FIG. 8 shows a cross-section detail of a cover hinge for the component box, in accordance with one embodiment.

FIG. 8 shows a cross-section detail of the cover hinge 510 for the component box 150, in accordance with one embodiment. Here, each of the one or more hinges 510 can include an L-shaped hinge having first leg 512 attached to the cover 310 and a second leg 514 attached to the central wall 422. The first leg 512 and second leg 514 are coupled at a pivot 516. In this example, the hinge structure is shaped so that the pivot 516 is raised up above an upper surface of the upper cover 310. This design allows for the cover 310 to swing away from the central wall 422 while the cover 310 is being opened. This swinging away motion pulls the cover 310 away from the central wall 422 so that the cover 310 does not roll against a gasket 520 when the cover 310 is opening.

Figure 9:
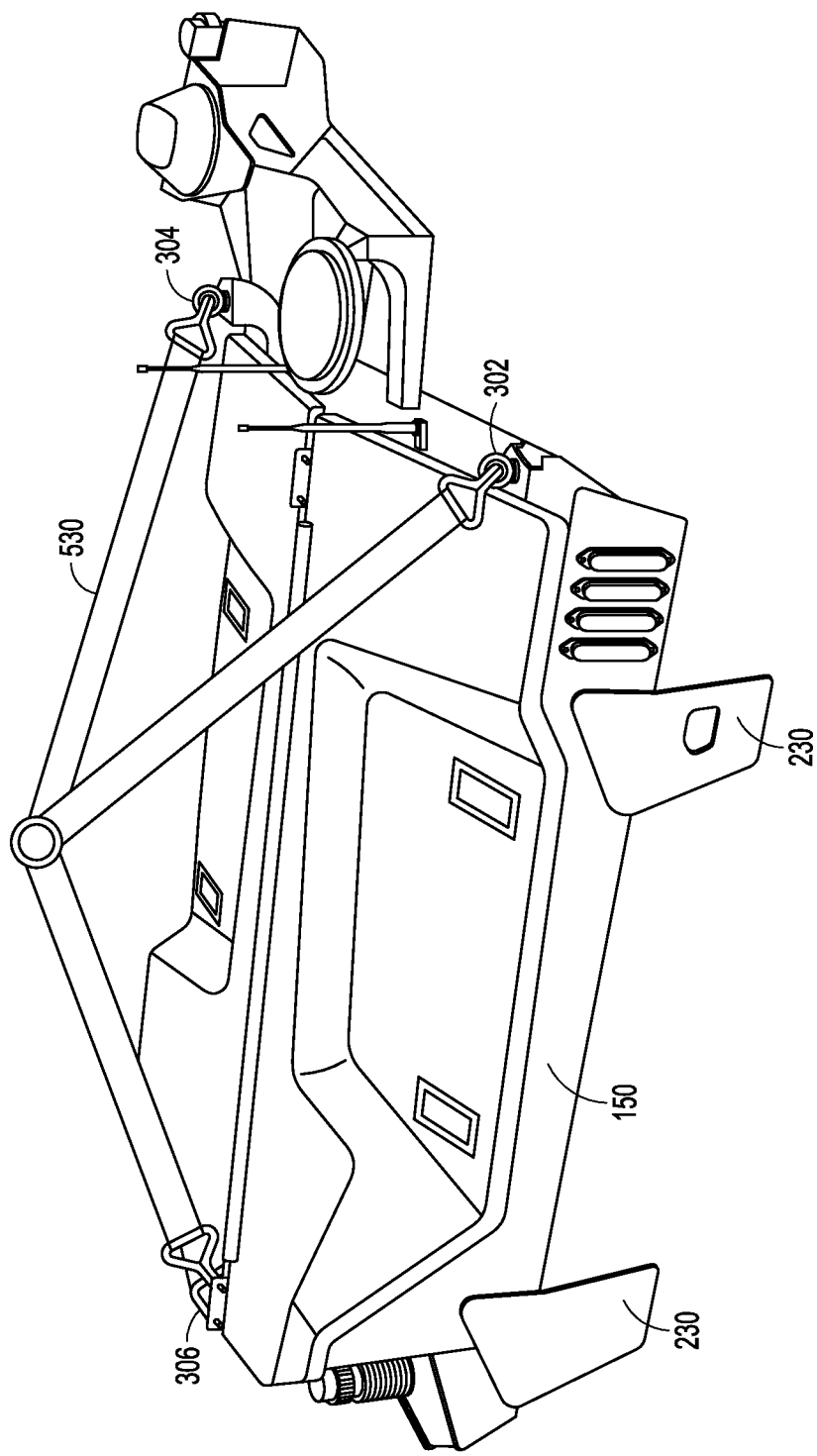
FIG. 9 shows a perspective view of the component box, in accordance with one embodiment.

FIG. 9 shows a perspective view of the component box 150, in accordance with one embodiment. As noted above, the component box 150 can include three lifting members with the first lifting member 302 at a back corner of the component box 150, the second lifting member 304 at an opposite back corner than the first lifting member 302, and the third lifting member 306 at a central front location of the component box 150 The three lifting members 302-306 allow for a harness 530 to attach to each of the lifting members to easily lift the component box 150 off the roof of the work machine 100.

Further, the component box 150 includes the plurality of legs 230 configured for mounting to the roof of the cab. In one example, the legs 230 can include an angled shape that are angled backward and include a plurality of bolt holes to receive bolts for mounting the component box 150 to the roof of the cab.

INDUSTRIAL APPLICABILITY

The present system is applicable during many situations in construction. For example, the present system can be used for compact track loaders and other work machines.

Accordingly, the present system provides an electrical component box associated with a work machine such as, a compact track loader (CTL). The electrical component box may be disposed on rooftop of a work machine. The electrical component box includes a structure with at least one bi-fold hinged cover and holds a plurality of components. The plurality of components may include blowers and ECMs that may be disposed in the electrical component box; the component box can further include antennas, one or more support structures for communication equipment (e.g., GPS, antennas etc.), a plurality of legs, and a plurality of indicator lights that may be disposed on the electrical component box.

In summary, the present system provides for a 360 degree field of view established by the lidar sensors and cameras and the placement of the antennas and other components to allow for that field of view in conjunction with the base structural elements of the box.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A work machine comprising:
   a machine frame;
   a component box holding a plurality of electrical components mounted to a roof of the machine frame;
   wherein the component box includes an enclosure compartment defined by a lower wall, four side walls and an upper cover, wherein the enclosure compartment includes a central wall extending a length of the enclosure compartment dividing the enclosure compartment into a first half and a second half, wherein one or more of the plurality of electrical components are located in the first half and a different one or more of the plurality of electrical components are located in the second half and none of the plurality electrical components are positioned to be in both the first half and the second half of the enclosure compartment; and
   a dual blower fan positioned within the enclosure compartment with one blower directed to the first half and a second blower directed to the second half.

2. The work machine of claim 1, wherein the dual blower fan is mounted at a front portion of the component box and is adjacent to one or more air intakes on the component box.

3. The work machine of claim 2, further including an air filter positioned at the air intakes.

4. The work machine of claim 1, wherein the plurality of electrical components include one or more thermally sensitive components and wherein the thermally sensitive components are positioned in the enclosure compartment within an airflow path.

5. The work machine of claim 4, wherein the thermally sensitive components include dual ECMs, with one ECM on each side of the central wall.

6. The work machine of claim 1, wherein the upper cover includes a bi-fold cover hinged at the central wall.

7. The work machine of claim 6, wherein the bi-fold cover includes a first cover and a second cover, each cover mounted to the central wall by one or more hinges.

8. A work machine comprising:
   a machine frame;
   a component box holding a plurality of electrical components mounted to a roof of the machine frame;
   wherein the component box includes an enclosure compartment defined by a lower wall, four side walls and an upper cover, wherein the enclosure compartment includes a central wall extending a length of the enclosure compartment dividing the enclosure compartment into a first half and a second half; and
   a dual blower fan positioned within the enclosure compartment with one blower directed to the first half and a second blower directed to the second half, wherein the upper cover includes a bi-fold cover hinged at the central wall, wherein the bi-fold cover includes a first cover and a second cover, each cover mounted to the central wall by one or more hinges, and wherein each of the one or more hinges includes an L-shaped hinge having first leg and a second leg coupled at a pivot, and wherein the pivot is raised up above an upper surface of the upper cover.

9. The work machine of claim 8, The work machine of claim 1, wherein the dual blower fan is mounted at a front portion of the component box and is adjacent to one or more air intakes on the component box.

10. The work machine of claim 9, further including an air filter positioned at the air intakes.

11. The work machine of claim 8, wherein the plurality of electrical components include one or more thermally sensitive components and wherein the thermally sensitive components are positioned in the enclosure compartment within an airflow path.

12. The work machine of claim 11, wherein the thermally sensitive components include dual ECMs, with one ECM on each side of the central wall.

13. The work machine of claim 8, wherein the dual blower fan is mounted at a front portion of the component box and is adjacent to one or more air intakes in a front side wall of the component box.

* * * * *